US012725052B2

(12) United States Patent
Sun et al.

(10) Patent No.: US 12,725,052 B2
(45) Date of Patent: Sep. 1, 2026

(54) STABLE PRESCRIPTIVE POLICY CONSTRUCTION

(71) Applicant: International Business Machines Corporation, Armonk, NY (US)

(72) Inventors: Wei Sun, Scarsdale, NY (US); Shivaram Subramanian, Frisco, TX (US); Youssef Drissi, Peekskill, NY (US); Markus Ettl, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 444 days.

(21) Appl. No.: 17/860,137

(22) Filed: Jul. 8, 2022

(65) Prior Publication Data

US 2024/0013068 A1 Jan. 11, 2024

(51) Int. Cl.
*G06N 5/022* (2023.01)
*G06F 16/901* (2019.01)
*G06F 18/243* (2023.01)
*G06N 5/025* (2023.01)

(52) U.S. Cl.
CPC ......... *G06N 5/022* (2013.01); *G06F 16/9027* (2019.01); *G06F 18/24323* (2023.01); *G06N 5/025* (2013.01)

(58) Field of Classification Search
CPC .... G06N 5/022; G06N 5/025; G06F 16/9027; G06F 18/24323
See application file for complete search history.

(56) References Cited

U.S. PATENT DOCUMENTS 6,717,921 B1 * 4/2004 Aggarwal ............... H04L 45/16 370/408
2005/0144147 A1 6/2005 Lee
2013/0282627 A1 10/2013 Faddoul
2022/0382935 A1 * 12/2022 Patel ....................... G06F 30/20
(Continued)

FOREIGN PATENT DOCUMENTS

CN 110532266 A * 12/2019 ......... G06F 16/2246

OTHER PUBLICATIONS

Biggs et al. (Model Distillation for Revenue Optimization: Interpretable Personalized Pricing, published Jun. 9, 2021) (Year: 2021).*
(Continued)

*Primary Examiner* — David Yi
*Assistant Examiner* — Syed Rayhan Ahmed
(74) *Attorney, Agent, or Firm* — Rakesh Roy

(57) ABSTRACT

A computer implemented method includes identifying, by one or more processors, a decision tree corresponding to an artificial intelligence model, detecting, by one or more processors, new data associated with an update to the identified decision tree, identifying, by one or more processors, counterfactual data corresponding to the new data, identifying, by one or more processors, one or more expected outcomes corresponding to the counterfactual data and the new data, and generating, by one or more processors, an updated decision tree based on the identified new data and the identified counterfactual data. A computer program product and computer system corresponding to the method are also disclosed.

20 Claims, 4 Drawing Sheets

(56) References Cited

U.S. PATENT DOCUMENTS

| | | | | |
|---|---|---|---|---|
| 2023/0112591 | A1* | 4/2023 | Torben-Nielsen | G06N 3/045 705/3 |
| 2023/0128532 | A1 | 4/2023 | Subramanian et al. | |

OTHER PUBLICATIONS

Sidorov et al. (Soft Similarity and Soft Cosine Measure: Similarity of Features in Vector Space Model, published 2014) (Year: 2014).*
Biggs et al., "Model Distillation for Revenue Optimization: Interpretable Personalized Pricing", arXiv:2007.01903v2 [stat.ML] Jun. 9, 2021, 18 pages.
Dwyer et al., "Decision Tree Instability and Active Learning", ECML 2007, LNAI 4701, pp. 128-139, 2007.
Gao et al., "Enhancing Counterfactual Classification via Self-Training", arXiv:2112.04461v1 [cs.LG] Dec. 8, 2021, 12 pages.
Last et al., "Improving Stability of Decision Trees", International Journal of Pattern Recognition and Artificial Intelligence, vol. 16, No. 02, (2002), pp. 145-159.
Li et al., "Instability of Decision Tree Classification Algorithms", SIGKDD 02, Edmonton, Alberta, Canada, pp. 570-575.
Perez et al., "Consolidated Trees: Classifiers with Stable Explanation. A Model to Achieve the Desired Stability in Explanation", ICAPR 2005, LNCS 3686, pp. 99-107, 2005, DOI: 10.1007/11551188_11.
Shannon et al., "Combining Classification Trees Using MLE", Statistics in Medicine, Statist. Med. 18, pp. 727-740, (1999), Received Jun. 1997, Accepted May 1998.
Sidorov et al., "Soft Similarity and Soft Cosine Measure: Similarity of Features in Vector Space Model", Computación y Sistemas vol. 18, No. 3, 2014, pp. 491-504, ISSN 1405-5546, DOI: 10.13053/CyS-18-3-2043.
Subramanian et al., "Constrained Prescriptive Trees via Column Generation", AAAI-2022, Feb. 2022, Preliminary Preprint Version, 9 pages.
Sun et al., "Ticket Pricing via Prescriptive Model Distillation", Abstract, Informs 2021, Oct. 27, 2021, 2 pages.

* cited by examiner

STABLE PRESCRIPTIVE POLICY CONSTRUCTION

BACKGROUND

The present invention relates generally to the field of prescriptive models for decision making, and more specifically to distributed computing for generating stable prescriptive policies.

Many modern business environments require accurate and interpretable prescriptive analytics for decision making. Prescriptive analytics use the outcome of a prediction model to determine a best course of action. For example, prescriptive analysis can be used in healthcare to prescribe personalized medicine and/or a personalized course of treatment. Prescriptive policies satisfy operational constraints and can eliminate rule conflicts in a proactive manner.

SUMMARY

As disclosed herein, a computer implemented method includes identifying, by one or more processors, a decision tree corresponding to an artificial intelligence model, detecting, by one or more processors, new data associated with an update to the identified decision tree, identifying, by one or more processors, counterfactual data corresponding to the new data, identifying, by one or more processors, one or more expected outcomes corresponding to the counterfactual data and the new data, and generating, by one or more processors, an updated decision tree based on the identified new data and the identified counterfactual data. A computer program product and computer system corresponding to the method are also disclosed.

DETAILED DESCRIPTION

Figure 1:
FIG. 1 depicts a block diagram of components of a stabilization system in accordance with at least one embodiment of the present invention.
Figure 1:
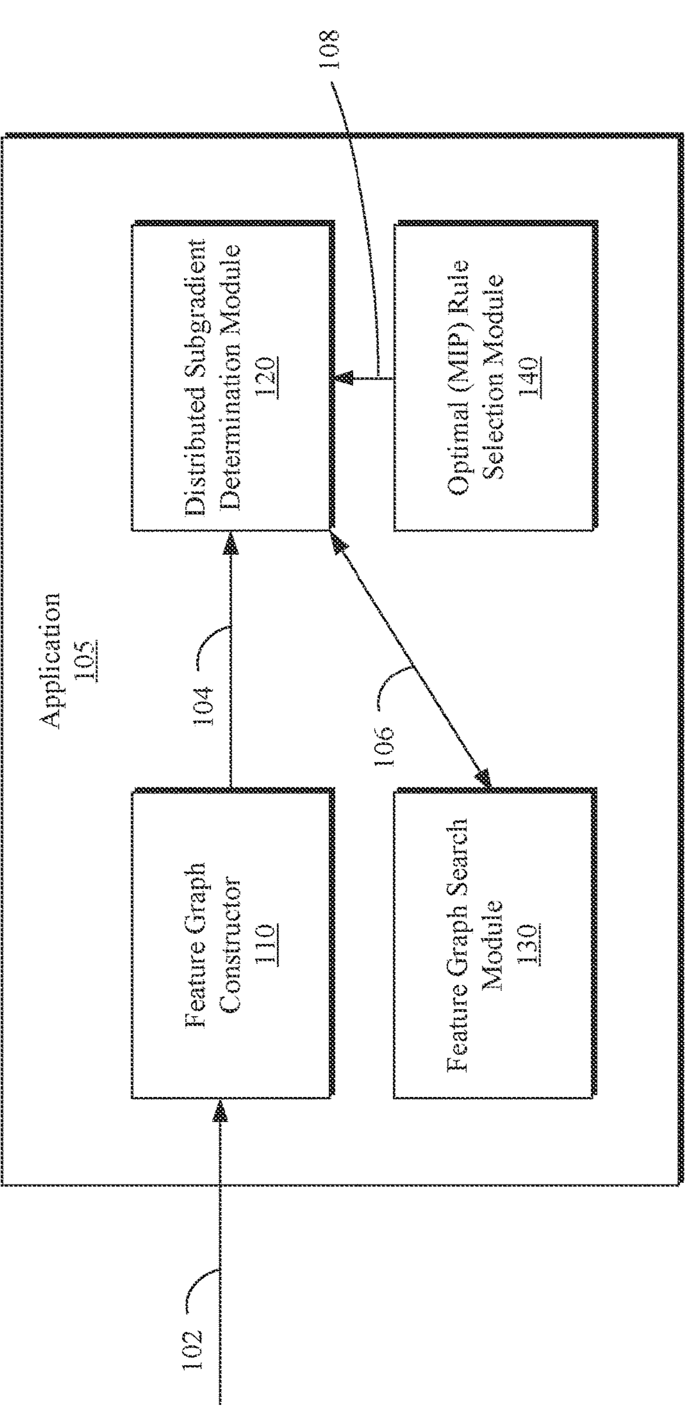

Decision trees (DTs) are frequently used in practice due to their human-like interpretability. However, DTs are also known to be highly unstable, i.e., slight changes in input data may result in drastically different tree structures. Ensemble methods have been proposed to improve stability at the expense of interpretability. Unstable policies generated from decision trees can lead to challenges in implementing and managing rules, as well as confusion and trust erosion of the source analytics. Existing notions of stability with respect to decision trees are often defined with respect to generalization error over a loss function, which does not consider the tree structure or the content of the resulting policy. Embodiments of the present invention quantify stability for policies, and determine a set of policies which optimize the underlying objective while maintaining stability.

Consider a use case specific to determining pricing policies for different customer segments in the context of airline bookings (representative of a high volume business environment). The customer segments may be divided into basic economy, main, business class, and first class bookings. Pricing policies as applied to airline bookings must be interpretable and consistent. For example, a policy for advanced bookings can minimize the effectiveness of policies for segments that book later; in other words, policies rewarding “early” bookings may minimize the effectiveness of policies for “late” bookings. Predicted booking conversions may not be unconstrained, but must be limited by dynamically changing availabilities; in other words, predictions must not override availability constraints as they arise. Ignoring capacities and cross-rule constraints can significantly erode perspective policy effectiveness. With respect to airline bookings, policies must be filed in order to satisfy aviation regulations, for example, that can differ by region, market, and time.

Optimal actions with respect to pricing policies may be determined according to an optimal action tree (OAT). To construct an optimal action tree, a set of coefficients are precomputed. In some embodiments, for every transaction (or sample) ‘i’, predicted demands $d_{ik}$ at price ladder point $p_k$ for all k are computed using AI modeling techniques known in the art. Constructing an optimal action tree may additionally include constructing an incidence matrix, such that matrix entry $a_{it}=1$ if a transaction $i \in T(t)$, wherein T(t)=set of transactions assigned to a rule ‘t’. Constructing an optimal action tree may additionally include identifying a penalty PEN that is harsh enough (i.e., meets a selected penalty threshold) to force an observation assigned to a single rule. The optimal action tree may depend on a plurality of decision variables, which can be divided into primary variables and auxiliary variables. Primary variables are column binary variables $z_{kt}=1$, if k-th price point is selected for all $i \in T(t)$ in rule t. Auxiliary variables are slack (or artificial) variables $s_i$ introduced to preserve feasibility during implementation. A sample optimal action tree is depicted with respect to FIG. 2.

In at least some embodiments, constructing an optimal action tree may include determining a risk management plan according to the following:

$$\text{Max Expected Revenue} = \text{Max } \Sigma_t \Sigma_{i,k} a_{it} d_{ik} p_k z_{kt} - \Sigma_i PEN \cdot s_i \quad (1)$$

Consider the following rules as applied to airline pricing policies; while the below embodiment is described entirely in terms of airline pricing and corresponding airline features, it should be appreciated that similar rules may be applied to other pricing models substituting appropriate variables and features where applicable. All references to airline specific features and variables below should be understood to be instructive rather than limiting and offer only one example of an environment in which such rules and policies may be applicable. Airline pricing policies may be dictated by the following rules:

Each transaction T must be covered by exactly one rule, according to:

$$\Sigma_{t,k} a_{it} z_{kt} + s_i = 1, \text{ for every } i \quad (2)$$

Further, the number of rules must be less than a user specified limit (cardinality adherence), according to:

$$\Sigma_{t,k} z_{kt} \leq N_{max} \quad (3)$$

Further, a number of conversions are dictated by market M (capacity limits), according to:

$$d^m_{min} \le \Sigma_{t \in M} \Sigma_{i,k} a_{it} z_{kt} d_{ik} \le d^m_{max} \quad (4)$$

Further, inter rule constraints may exist between q and r, where q«r, that is, q is a more restrictive rule than r (e.g., q represents a non-refundable fare while r is a fully refundable ticket), then $$\Sigma k\ p_k z_{t(q)} \le \Sigma_k p_k z_{t(r)} \text{for all}(q,r) \quad (5)$$

Lastly, a constraint set Z exists indicating that each decision variable 'z' is binary.

With each data refresh, the counterfactual estimator that predicts the probabilities $d_{ik}$ may change, which affects downstream policies. Said downstream policies optimize the expected outcomes dependent on $d_{ik}$. As additional input, a set of existing rules $z' \in [0,1]^{K \times T}$ may be applied, where K is the dimension of price grid points, and T is the rule space. The goal is to determine a new set of rules $z \in [0,1]^{K \times T}$ which optimizes the underlying objective, while remaining as close to z' as possible. Embodiments of the present invention define a metric sim(z,z') by which the similarity between z and z' (an initial and a new rule space) may be determined. Embodiments of the present invention additionally update an underlying objective to encourage similarity between policies, i.e., maximizing "objective(z)+λ*sim(z,z'), wherein λ is a regulator to be determined via cross-validation.

A matrix or vector norm may be utilized to measure dissimilarity between z' and z, such as an L1 or L2 norm (wherein an L1 norm is an absolute deviation or absolute error, and L2 is a squared deviation or squared error). Given that z matrices are sparse, norm evaluation can be executed quickly; however, such measures can ignore the features that make up the rule. For example, consider the following 3 rules, for which existing L1 and L2 measures on Z (excluding rule context) will be 0 for all pairs:

Rule 1: AP=7, WKS=1, Price=$339

Rule 2: AP=14, WKS=1, Price=$339

Rule 3: AP=21, WKS=0, Price=$79.

With respect to rules 1, 2, and 3, AP represents "advanced purchase", which in this case is measured in days. WKS indicates "weekend stay", which is a binary value with 1 representing yes and 0 representing no. Price represents the price of the ticket. Rule 1 and rule 2 as defined above are more similar in terms of rule components than rule 3, given their similarities in both price and WKS.

Define a soft policy similarity matrix $S(Z, Z') \in \Re^{N \times N'}$, wherein $$S_{ij} = \text{cosine}(v_i, v_j) = \frac{\sum_{k=1}^{G} v_{ik} v_{jk}}{\sqrt{\sum_{k=1}^{G} v_{ik}^2} \sqrt{\sum_{k=1}^{G} v_{ij}^2}}$$

and $v_i$ and $v_j$ correspond to the features of active policy i and j from Z, Z' respectively. By definition, $0 \le S_{ij} \le 1$, wherein a score close to zero would indicate dissimilarity between the policies, and a score of 1 would indicate the policies are identical. The objective can be rewritten as $$\max_Z \text{ expected objective}(Z) + \lambda \frac{\|S(Z, Z')\|}{\sqrt{N \times N'}},$$

and can alternatively be incorporated as a constraint.

In addition, different feature importance can be captured with different weights; referring back to the airline pricing example, customer features, flight features, fare features could be weighted differently. Feature weight $$w_i \ge 0, \sum_{k \in I}^{n} w_i = 1 \Rightarrow S_{ij} = \text{weighted}_{cosine(v_i, v_j)} = \frac{\sum_{k=1}^{G} w_k v_{ik} v_{jk}}{\sqrt{\sum_{k=1}^{G} v_{ik}^2} \sqrt{\sum_{k=1}^{G} v_{ij}^2}}.$$

In other words, it may be desirable to impose less restriction on fare prices as opposed to other types, i.e., smaller w, for fare features than for other features.

FIG. 1 depicts a block diagram of components of a stabilization system 100 in accordance with at least one embodiment of the present invention. As depicted, stabilization system 100 includes an application 105 and a data source configured to provide data 102. Stabilization system 100 may enable quantified stability in decision tree implementations. Stabilization system 100 may additionally enable policy construction which optimizes an underlying objective while maintaining stability relative to the quantified stability metrics.

Application 105 may be configured to receive data 102 from a data source. In some embodiments, data 102 may include an existing rule set corresponding to a decision tree, one or more transactions, constraints (including, but not limited to, meta-rules, capacity restraints, brand/price relationships, etc.), feature rankings corresponding to one or more features, predicted scores across a pricing grid, etc.

As depicted, application 105 may include a feature graph constructor 110, a distributed subgradient determination module 120, a feature graph search module 130, and an optimal (MIP) rule selection module 140. Feature graph constructor 110 may be configured to receive data 102. In at least some embodiments, feature graph constructor 110 is configured to process transactions and features included in data 102, such as training data. The training data received via data 102 may include a list of features sorted in order of importance as suggested by a counterfactual estimator. Feature graph constructor 110 may be configured to, for a feature 'f', create a node for one or more distinct feature values $L_f$. In at least some embodiments, feature graph constructor 110 denotes a last node (level $L_{f-1}$) as a SKIP node. If a path corresponding to a rule/policy passes through the SKIP node, feature f is not a part of the rule/policy. Feature graph constructor 110 may additionally be configured to create a source node 'o' and a sink node 's'. A node is considered a source if no path has said node as a destination; similarly, a node is considered a sink if no path has said node as its source. In at least some embodiments, feature graph constructor 110 creates a node set FROM={o} for a feature index f=0. Feature graph constructor 110 may be configured to connect FROM nodes to TO nodes by directed arcs. In at least some embodiments, feature graph constructor 110 adds to an arc set A according to $\{n_{i,f}\} \times \{n_{j,f+1}\}$ for all i, j. If f=n−1, the TO node=SINK 's'. If f<n, f=f+1 until a limit is reached, at which point the iterations are stopped and arc set A is returned. The total number of nodes=$\Sigma_f L_f + 2$, and the total number of arcs=$\Sigma_f(L_f + L_{f+1})$. The total number of feasible paths/rules=$\Pi_f L_f$.

Distributed subgradient determination module 120 may be configured to receive processed data 104 from feature graph constructor 110. Processed data 104 may include, for example, the determined total number of nodes, the determined total number of arcs, the determined total number of feasible paths/rules, identified sink or source nodes, and/or distinct feature values. In at least some embodiments, distributed subgradient determination module 120 is configured to initialize shadow prices and column preprocessing by constructing a Lagrangian Relaxation (LR) using rules generated from a greedy decision tree. Distributed subgradient determination module 120 may be configured to maximize an expected reward according to:

$$\text{Max expected reward}=(\max(Z,d_{ik})+\lambda((\|S(Z,Z')\|)/\sqrt{}(N\times N'))) \quad (6)$$

In at least some embodiments, distributed subgradient determination module 120 may be configured to incorporate cover, capacity, or cardinality constraints within the objective via Lagrange multipliers (E). The resultant Lagrangian Relaxation (LR) decomposes into simple bound-constrained problems separable by market and rule, such that it can be solved and the resultant objective $L_k$ can be computed. In at least some embodiments, a best (or lowest) L* may be recorded or maintained.

In at least some embodiments, distributed subgradient determination module 120 is configured to compute capacity constraint violations (i.e., negative subgradients). Distributed subgradient determination module 120 may be configured to compute a resultant capacity violation error vector $d_k$. In at least some embodiments, distributed subgradient determination module 120 is configured to compute a deflected subgradient according to:

$$g_{k+1}=\alpha d_k+(1-\alpha)g_k \quad (7)$$

With respect to equation 7, the chosen value of α minimizes the total violation in the new search direction g, but can be no less than a minimum threshold (e.g., $10^{-4}$). In at least some embodiments, distributed subgradient determination module 120 is configured to obtain primal estimates $s^*_{k+1}=\alpha^* s_k+(1-\alpha)s^*_k$. The violation error vector $d_k$ is calculated as the difference between the availability and predicted demand for a given market and product.

In at least some embodiments, distributed subgradient determination module 120 is configured to update dual vector E according to:

$$E_{k+1}=E_k-2\alpha(\theta-L^*)^*(g/(\|g\|^2)) \quad (8)$$

With respect to equation 8, θ is a carefully chosen target value. This target value can be calculated as L*+|L*|, but can be no less than a minimum threshold value $\theta_{min}$ (e.g., 10.0). Distributed subgradient determination module 120 may be configured to project $E_{k+1}$ onto its bound to preserve dual feasibility. In at least some embodiments, distributed subgradient determination module 120 is configured to stop when g reaches an identified target "small" (i.e., below a selected threshold) value, or when a selected time limit expires. Upon termination, distributed subgradient determination module 120 is configured to return $E_k$ of a current iteration as a best shadow result estimate. In some embodiments, distributed subgradient determination module 120 is not configured to terminate processing until all rules are met. Distributed subgradient determination module may be configured to provide one or more Lagrangian Duals indicative of one or more shadow result estimates to feature graph search module 130.

Feature graph search module 130 may be configured to generate one or more candidate rules according to data 106 received from distributed subgradient determination module 120. In at least some embodiments, feature graph search module 130 is configured to execute the following algorithm:

Initialization: k=0, sorted partial-path list $L_k$=[O], Sorted feasible path{P}

Iteration K:

For all j in sorted $L_k$:

```
Lk = Lk/j
  fji = Pi ⊗i ϵ FS(j) //FS are forward star arcs of node I sorted by
     AI-predicted propensity changes
  If i = D:
     If R(fji) > 0, fji → {P}
     Else:
        Update path resource variables: {length, count, . . . , reduced cost
     at all price points}
        Observations O(i,j) = O(j) ∩ O(j−1) // update observations after
        adding split
        Length (i,j) = Length (j) +1 if j is a +/− node // update length after
        a split
     If feasible split // Length(fji) ≤ D and Count(fji) ≥ Nmin
  If |P| ≥ K or {Lk+1} = Ø or iteration limit kmax is met:
     Stop and return {P}
  Else:
     k=k+1, return to top of loop
```

Optimal rule selection module 140 may be configured to identify an optimal selection of rules. The final set of optimal rules are obtained by solving a Mixed-Integer-Program (MIP) using a commercial MIP solver package like CPLEX. This MIP identifies the best combination (e.g., 10 best per market) from among the pool of candidate rules (e.g., 10, 000 candidates) that maximizes the selected KPIs (e.g., predicted revenue) while also satisfying all operational constraints. In at least one embodiment, optimal rule selection module 140 is configured to provide a set of optimal rules 108 to distributed subgradient determination module 120.

Figure 2:
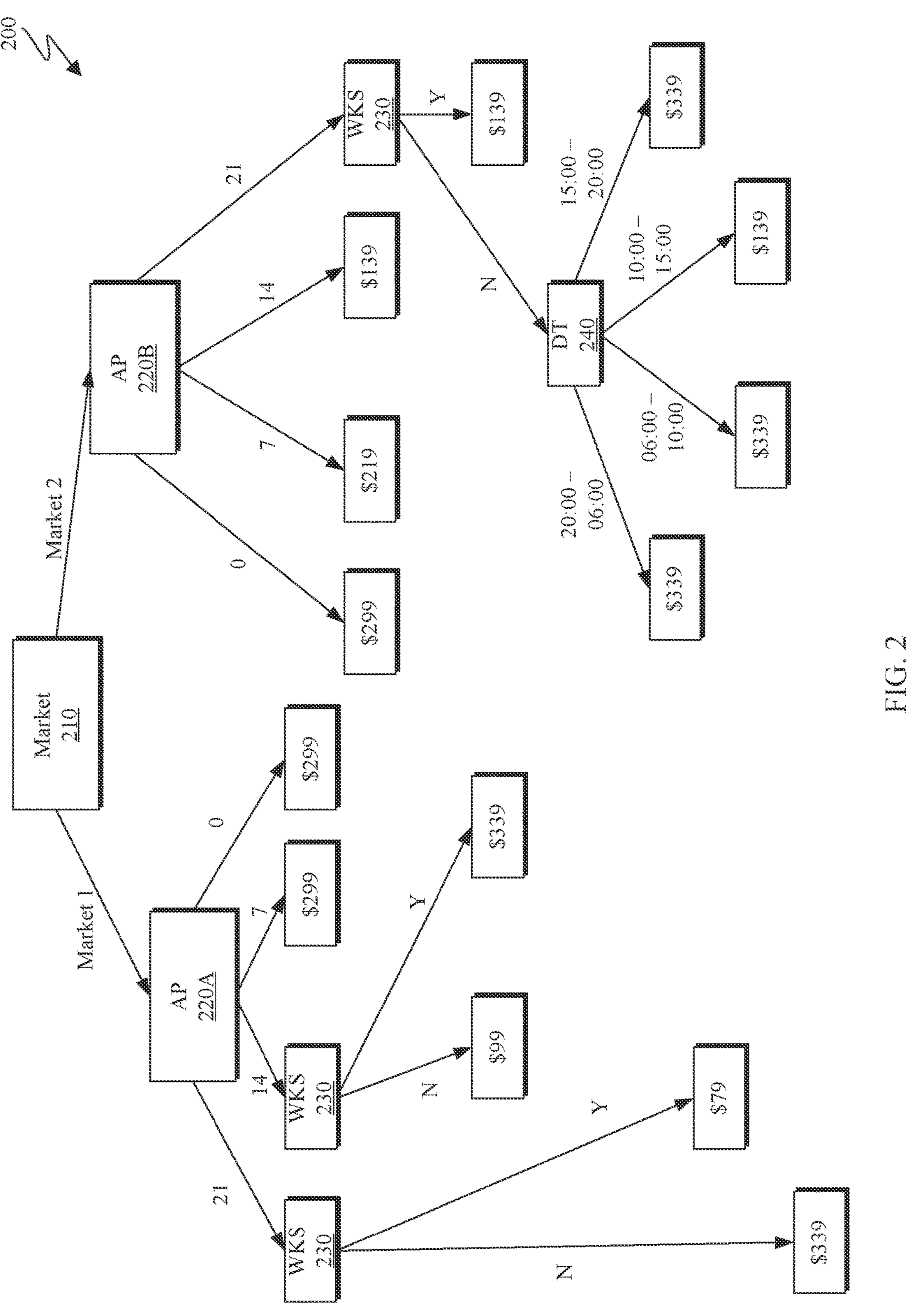
FIG. 2 depicts one example of an optimal action tree in accordance with at least one embodiment of the present invention.

FIG. 2 depicts one example of an optimal action tree (OAT) 200 in accordance with at least one embodiment of the present invention. Optimal action tree (OAT) 200 as depicted includes action paths defined with respect to an airline pricing model scenario. As depicted, optimal action tree 200 includes a market split 210, advance purchase (AP) splits 220A and 220B, weekend stay (WKS) splits 230, and departure time (DT) splits 240. Each path as depicted concludes at a price block, indicating an optimal price for a ticket purchase meeting the set of conditions indicated by the branches. It should be appreciated that, while FIG. 2 includes specific versions of the action paths and branches for the sake of clarity, these paths and branches are not intended to be exhaustive or limiting, but rather representative of general OAT paths and branches.

As depicted, market split 210 yields two subsequent branches. A path along OAT 200 will diverge at market split 210 based on which market the pricing is for. With respect to the depicted embodiment, the available markets are designated along the branches originating at market split 210, and are defined as "Market 1" and "Market 2". It should be appreciated that in other embodiments, the market split may diverge into more than two subsequent paths. With respect to other embodiments (not depicted), each market path may correspond to an individual airport rather than a general "market" per se. As depicted, each market path subsequently leads to an advanced purchase split 220A or 220B.

As depicted, each advanced purchase split 220A and 220B yields four subsequent branches delineated by how far in advance a ticket is purchased. With respect to the depicted embodiment, the advanced purchase branches are 0, 7, 14, and 21, and are defined as the minimum number of days by which a ticket must be purchased to qualify for the defined advanced purchase period. In other words, the 0 branch indicates any purchases made between the day of the flight and 6 days prior to the flight; the 7 branch indicates any purchases made between 7 days prior to the flight and 13 days prior to the flight; the 14 branch indicates any purchases made between 14 days prior to the flight and 20 days prior to the flight; and the 21 branch indicates any purchases made 21 days or more prior to the flight. It should be appreciated that the depicted advance purchase classifications correspond to a single embodiment of the advanced purchase options but are not intended to be exhaustive or limiting. For example, other versions of advanced purchase limitations may be measured in weeks rather than days, and yet other limitations measured in days may be split in five day periods rather than seven, etc. As depicted, some of the advanced purchase splits 220A or 220B immediately yield prices, indicating that market and advanced purchase are the only features applied to those ticket purchases. Other advanced purchase splits 220 branch into weekend stay (WKS) splits 230, meaning other features must be considered before a price can be determined.

As depicted, each WKS split 230 yields two subsequent branches delineated by whether or not the ticket includes a weekend in the itinerary. The "yes" branch (depicted with a "Y") indicates that a weekend stay is included in the pricing of the ticket. The "no" branch (depicted with an "N") indicates that no weekend stay is included in the pricing of the ticket. In some embodiments, WKS may alternatively be referred to as a "Saturday stay". As depicted, some of the WKS splits 230 immediately yield prices, indicating that market, WKS, and advanced purchase (in other words, the splits prior to the prices in the OAT 200) are the only features applied to those ticket purchases. Other WKS splits 230 lead to a departure time (DT) split 240, meaning other features must be considered before a price can be determined.

As depicted, each departure time (DT) split 240 yields four subsequent branches delineated by the departure time corresponding to the purchased ticket. Each branch is labeled according to the corresponding departure time; a first branch corresponds to tickets with a departure time between 20:00 and 06:00 (8 PM and 6 AM), a second branch corresponds to tickets with a departure time between 06:00 and 10:00 (6 AM and 10 AM), a third branch corresponds to tickets with a departure time between 10:00 and 15:00 (10 AM and 3 PM), and a fourth branch corresponds to tickets with a departure time between 15:00 and 20:00 (3 PM and 8 PM). In general, as depicted, each branch of the departure time split 240 immediately yields a price, indicating that no further features must be considered before a price can be determined.

Figure 3:
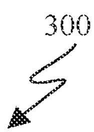
FIG. 3 is a flowchart depicting a prescriptive model stabilization method in accordance with at least one embodiment of the present invention.
Figure 3:
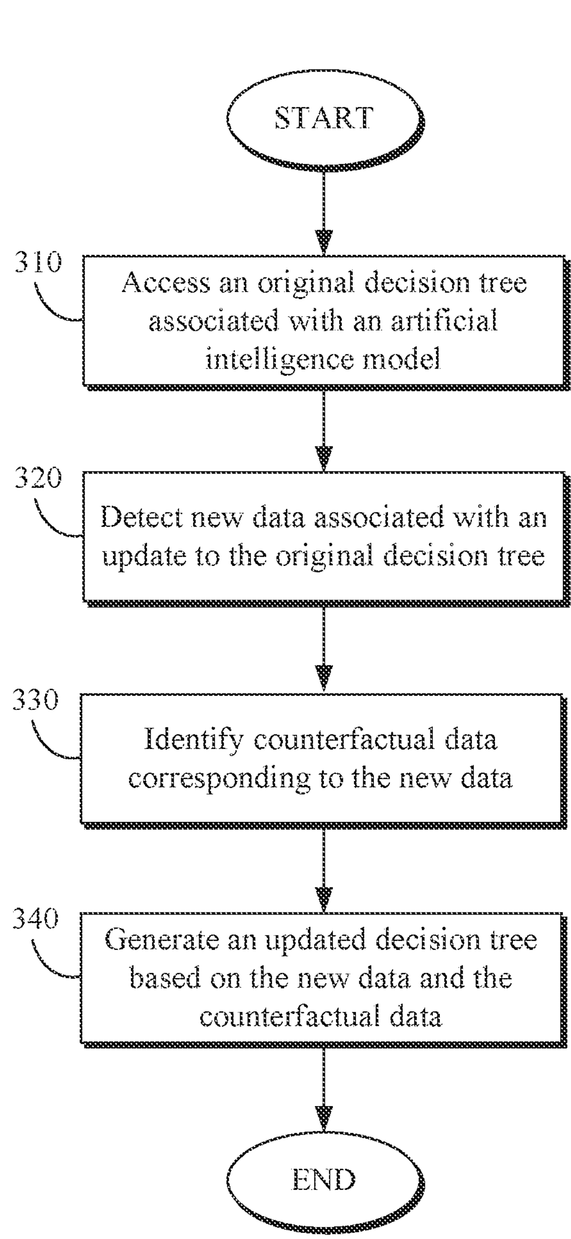

FIG. 3 is a flowchart depicting a prescriptive model stabilization method 300 in accordance with at least one embodiment of the present invention. As depicted, prescriptive model stabilization method 300 includes accessing (310) an original decision tree associated with an artificial intelligence model, detecting (320) new data associated with an update to the original decision tree, identifying (330) counterfactual data corresponding to the new data, and generating (340) an updated decision tree based on the new data and the counterfactual data. Prescriptive model stabilization method 300 may enable increased stability with respect to a subject prescriptive model.

Accessing (310) an original decision tree associated with an artificial intelligence model may include identifying, by one or more processors, an existing decision tree utilized by an artificial intelligence model. In at least some embodiments, the original decision tree corresponds to an optimal action tree (such as OAT 200 described with respect to FIG. 2). In general, accessing (310) an original decision tree associated with an artificial intelligence model includes identifying a decision tree which informs an AI model of interest. Accessing (310) an original decision tree associated with an artificial intelligence model may additionally include identifying one or more data sources which influence the AI model, and, in some embodiments, specific data items or data types from the data sources which influence the AI model. With respect to the previously described airline pricing model, an original decision tree may be a tree configured to determine ticket pricing based on one or more features such as departure time, weekend stay, market, advanced purchasing, etc.

Detecting (320) new data associated with an update to the original decision tree may include detecting updates to data items which influence the accessed decision tree. In at least some embodiments, detecting (320) new data associated with an update to the original decision tree includes detecting a change to data items which informs the original decision tree. Detecting (320) new data associated with an update to the original decision tree may additionally include detecting an influx of new data items which may alter the AI model. With respect to the previously described airline pricing model, new data could include data affecting seat availability. New data could additionally include updates to known feature data; for example, new data could include an adjustment to the purchase incentives offered for advanced purchases around the holiday season, etc.

Identifying (330) counterfactual data corresponding to the new data may include analyzing the detected new data to identify one or more expected outcomes. Counterfactual analysis enables evaluators to attribute cause and effect between interventions in data. A counterfactual is an estimation of what would have happened to beneficiary data in the absence of the interventions. With respect to the previously described airline pricing model, consider data indicating ticket prices for ticket purchase including a weekend stay. The counterfactual data in this case could be ticket prices in the absence of a weekend stay.

Generating (340) an updated decision tree based on the new data and the counterfactual data may include updating the original decision tree to reflect updated outcomes in light of the new data and the counterfactual data. In at least some embodiments, generating (340) an updated decision tree includes generating a set of optimal rules for application relative to the prescriptive model. Generating (340) an updated decision tree based on the new data and the counterfactual data may include determining a similarity between the set of optimal rules and an existing set of rules. The similarity level may be an appropriate indicator for a stability level of the model as it transitions from an old set of rules to the set of optimal rules.

Figure 4:
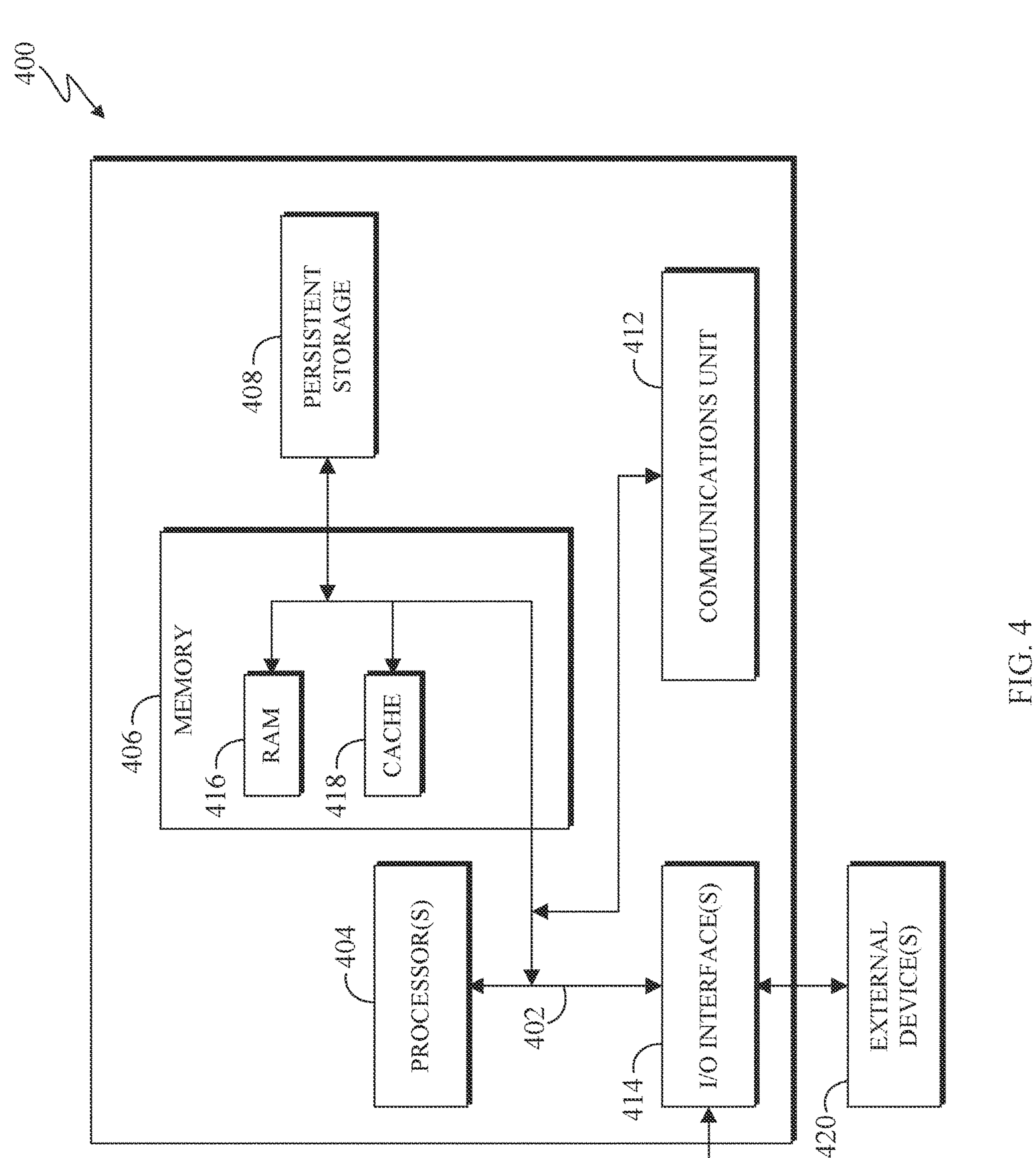
FIG. 4 is a block diagram of components of a computing system in accordance with at least one embodiment of the present invention.

FIG. 4 depicts a block diagram of components of computing system 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computing system 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:

identifying a decision tree corresponding to an artificial intelligence model, wherein the decision tree comprises an old rule, a set of precomputed coefficients, and an incidence matrix that maps a transaction to the old rule;

executing a counterfactual estimator to produce a sorted list of features from a training data, wherein a feature graph for a feature in the sorted list includes a node corresponding to a value of the feature and a last node as a SKIP node wherein a path corresponding to a particular rule passing through the SKIP node indicates that the feature is not a part of the particular rule;

detecting new data associated with an update to the identified decision tree, wherein the new data comprises (i) an update to a known feature in the sorted list of features, (ii) an intervention, and (iii) a beneficiary data;

further executing the counterfactual estimator to output counterfactual data corresponding to the new data by analyzing the new data according to the sorted list of features and producing an expected outcome, the expected outcome being an effect on the beneficiary data in an absence of the intervention;

generating, by one or more processors, an updated decision tree based on the identified new data and the identified counterfactual data, wherein the generating comprises generating a new rule executable by the artificial intelligence model, wherein the new rule corresponds to the expected outcome; and updating the artificial intelligence model from the old rule to the new rule.

2. The computer implemented method of claim 1, wherein generating an updated decision tree based on the identified new data and the identified counterfactual data includes generating an optimal set of rules for the artificial intelligence model, the optimal set of rules comprising the new rule.

3. The computer implemented method of claim 2, further comprising:

determining a similarity level between the optimal set of rules for the artificial intelligence model and an existing set of rules corresponding to the decision tree.

4. The computer implemented method of claim 3, wherein determining a similarity level between the optimal set of rules for the artificial intelligence model and an existing set of rules corresponding to the decision tree includes determining a cosine similarity between the optimal set of rules and the existing set of rules in addition to a measure of similarity between top features associated with the optimal set of rules and the existing set of rules.

5. The computer implemented method of claim 1, wherein the artificial intelligence model is a prescriptive analytics model.

6. The computer implemented method of claim 2, wherein generating an optimal set of rules for the artificial intelligence model includes maximizing an expected output of the artificial intelligence model according to a Lagrangian Relaxation.

7. The computer implemented method of claim 6, wherein the expected output is maximized according to one or more selected feature weights.

8. A computer program product comprising:

one or more computer readable storage media and program instructions stored on the one or more computer readable storage media, the program instructions comprising instructions to:

identifying a decision tree corresponding to an artificial intelligence model, wherein the decision tree comprises an old rule, a set of precomputed coefficients, and an incidence matrix that maps a transaction to the old rule;

executing a counterfactual estimator to produce a sorted list of features from a training data, wherein a feature graph for a feature in the sorted list includes a node corresponding to a value of the feature and a last node as a SKIP node wherein a path corresponding to a particular rule passing through the SKIP node indicates that the feature is not a part of the particular rule;

detecting new data associated with an update to the identified decision tree, wherein the new data comprises (i) an update to a known feature in the sorted list of features, (ii) an intervention, and (iii) a beneficiary data;

further executing the counterfactual estimator to output counterfactual data corresponding to the new data by analyzing the new data according to the sorted list of features and producing an expected outcome, the expected outcome being an effect on the beneficiary data in an absence of the intervention;

generating an updated decision tree based on the identified new data and the identified counterfactual data, wherein the generating comprises generating a new rule executable by the artificial intelligence model, wherein the new rule corresponds to the expected outcome; and updating the artificial intelligence model from the old rule to the new rule.

9. The computer program product of claim 8, wherein the program instructions to generate an updated decision tree based on the identified new data and the identified counterfactual data comprise instructions to generate an optimal set of rules for the artificial intelligence model, the optimal set of rules comprising the new rule.

10. The computer program product of claim 9, the program instructions further comprising instructions to determine a similarity level between the optimal set of rules for the artificial intelligence model and an existing set of rules corresponding to the decision tree.

11. The computer program product of claim 8, wherein the program instructions to determine a similarity level between the optimal set of rules for the artificial intelligence model and an existing set of rules corresponding to the decision tree comprise instructions to determine a cosine similarity between the optimal set of rules and the existing set of rules, in addition to a measure of similarity between the top features associated with the optimal set of rules and the existing set of rules.

12. The computer program product of claim 8, wherein the artificial intelligence model is a prescriptive analytics model.

13. The computer program product of claim 9, wherein the program instructions to generate an optimal set of rules for the artificial intelligence model comprise instructions to maximize an expected output of the artificial intelligence model according to a Lagrangian Relaxation.

14. The computer program product of claim 13, wherein the expected output is maximized according to one or more selected feature weights.

15. A computer system comprising:

one or more computer processors;

one or more computer-readable storage media;

program instructions stored on the computer-readable storage media for execution by at least one of the one or more processors, the program instructions comprising instructions to:

identifying a decision tree corresponding to an artificial intelligence model, wherein the decision tree comprises an old rule, a set of precomputed coefficients, and an incidence matrix that maps a transaction to the old rule;

executing a counterfactual estimator to produce a sorted list of features from a training data, wherein a feature graph for a feature in the sorted list includes a node corresponding to a value of the feature and a last node as a SKIP node wherein a path corresponding to a particular rule passing through the SKIP node indicates that the feature is not a part of the particular rule;

detecting new data associated with an update to the identified decision tree, wherein the new data comprises (i) an update to a known feature in the sorted list of features, (ii) an intervention, and (iii) a beneficiary data;

further executing the counterfactual estimator to output counterfactual data corresponding to the new data by analyzing the new data according to the sorted list of features and producing an expected outcome, the expected outcome being an effect on the beneficiary data in an absence of the intervention;

generating an updated decision tree based on the identified new data and the identified counterfactual data, wherein the generating comprises generating a new rule executable by the artificial intelligence model, wherein the new rule corresponds to the expected outcome; and updating the artificial intelligence model from the old rule to the new rule.

16. The computer system of claim 15, wherein the program instructions to generate an updated decision tree based on the identified new data and the identified counterfactual data comprise instructions to generate an optimal set of rules for the artificial intelligence model.

17. The computer system of claim 16, the program instructions further comprising instructions to determine a similarity level between the optimal set of rules for the artificial intelligence model and an existing set of rules corresponding to the decision tree.

18. The computer system of claim 15, wherein the artificial intelligence model is a prescriptive analytics model.

19. The computer system of claim 15, wherein the program instructions to determine a similarity level between the optimal set of rules for the artificial intelligence model and an existing set of rules corresponding to the decision tree comprise instructions to determine a cosine similarity between the optimal set of rules and the existing set of rules, in addition to an optional measure of similarity between the top features associated with the optimal set of rules and the existing set of rules.

20. The computer system of claim 15, wherein the program instructions to generate an optimal set of rules for the artificial intelligence model comprise instructions to maximize an expected output of the artificial intelligence model according to a Lagrangian Relaxation.

* * * * *